(12) United States Patent
Driscoll, Jr. et al.

(10) Patent No.: US 6,356,296 B1
(45) Date of Patent: Mar. 12, 2002

(54) METHOD AND APPARATUS FOR IMPLEMENTING A PANOPTIC CAMERA SYSTEM

(75) Inventors: Edward Driscoll, Jr., Portola Valley; Willard Curtis Lomax, Sunnyvale; Howard Morrow, San Jose, all of CA (US)

(73) Assignee: BeHere Corporation, Cupertino, CA (US)

(*) Notice: Subject to any disclaimer, the term of this patent is extended or adjusted under 35 U.S.C. 154(b) by 0 days.

(21) Appl. No.: 08/853,048

(22) Filed: May 8, 1997

(51) Int. Cl.[7] .................................................. H04N 7/00
(52) U.S. Cl. ............................ 348/36; 396/21; 396/419; 348/143; 352/69; 352/70; 352/71
(58) Field of Search ............................ 348/36, 38, 39, 348/143; 354/95; 352/69

(56) References Cited

U.S. PATENT DOCUMENTS

| | | | |
|---|---|---|---|
| 2,146,662 A | 2/1939 | Van Albada | 88/32 |
| 2,244,235 A | 6/1941 | Ayres | 88/69 |
| 2,628,529 A | 2/1953 | Braymer | 88/32 |
| 2,654,286 A | 10/1953 | Cesar | 88/1 |
| 3,205,777 A | 9/1965 | Brenner | 88/97 |
| 3,692,934 A | 9/1972 | Herndon | |
| 3,723,805 A | 3/1973 | Scarpino et al. | |
| 3,785,715 A | 1/1974 | Mechlenborg | 350/55 |
| 3,832,046 A | 8/1974 | Mecklenborg | 352/69 |
| 3,846,809 A | 11/1974 | Pinzone et al. | 354/95 |

(List continued on next page.)

FOREIGN PATENT DOCUMENTS

| | | |
|---|---|---|
| GB | 2 221 118 A | 1/1990 |
| GB | 2289820 | 11/1995 |

OTHER PUBLICATIONS

Supplemental Information Disclosure Statement in re: the Application of Steven D. Zimmerman, et al. Application No. 08/662,410; 08 Pages including PTO 1449 Form citing 19 references.Application No. 08/662,410; Filed Jul. 12, 1996.

Heckbert, P., "Survey to Texture Mapping" IEEE CG&A, Nov. 1986, pp. 56–67.

Defendants IPI's Notice of Reliance of Prior Art and Witnesses, Civil Action of Interactive Pictures Corporation, A/K/A Omniview, Inc. v. Infinite Pictures, Inc. and Bill Tillman, Case No. 3–96–849; 05 Pages. Filed: Dec. 8, 1997, in U.S.D.C., Eastern District of Tennessee.

(List continued on next page.)

*Primary Examiner*—Chris Kelley
*Assistant Examiner*—Shawn S. An
(74) *Attorney, Agent, or Firm*—Daniel B. Curtis; Dag H. Johansn

(57) ABSTRACT

A panoptic camera system that can be used to capture all the light from a hemisphere viewing angle is disclosed. The panoptic camera comprises a main reflecting mirror that reflects light from an entire hemisphere onto an image capture mechanism. The main reflecting mirror consists of a paraboloid shape with a dimple on an apex. The surface area around the dimple allows the main reflector to capture light from behind an image capture mechanism or a second reflector. When two panoptic camera systems that capture the light from an entire hemisphere are placed back to back, a camera system that "sees" light from all directions is created. A stereo vision panoramic camera system is also disclosed. The stereo vision panoramic camera system comprises two panoramic camera systems that are separated by a known distance. The two panoramic camera systems are each placed in a "blind spot" of the other panoramic camera system. By using the different images generated by the two panoramic camera systems and the known distance between the two panoramic camera systems, the range to objects within the panoramic images can be determined.

6 Claims, 13 Drawing Sheets

U.S. PATENT DOCUMENTS

| | | | |
|---|---|---|---|
| 3,872,238 A | 3/1975 | Herndon | |
| 3,934,259 A | 1/1976 | Krider | 354/94 |
| 3,998,532 A | 12/1976 | Dykes | |
| 4,012,126 A | 3/1977 | Rosendahl et al. | 350/198 |
| 4,017,145 A | 4/1977 | Jerie | 350/7 |
| 4,038,670 A | 7/1977 | Seitz | 354/96 |
| 4,058,831 A | 11/1977 | Smith | 358/87 |
| 4,078,860 A | 3/1978 | Globus et al. | 352/69 |
| 4,157,218 A | 6/1979 | Gordon et al. | 354/66 |
| 4,190,866 A | 2/1980 | Luknar | 358/229 |
| 4,241,985 A | 12/1980 | Globus et al. | 354/99 |
| D263,716 S | 4/1982 | Globus et al. | D16/1 |
| 4,326,775 A * | 4/1982 | King | 350/320 |
| 4,395,093 A | 7/1983 | Rosendahl et al. | 350/441 |
| 4,429,957 A | 2/1984 | King | 350/423 |
| 4,463,380 A | 7/1984 | Hooks, Jr. | 358/160 |
| 4,484,801 A | 11/1984 | Cox | |
| 4,518,898 A | 5/1985 | Tarnowski et al. | |
| 4,549,208 A | 10/1985 | Kamejima et al. | |
| 4,561,733 A | 12/1985 | Kreischer | 350/618 |
| 4,566,763 A | 1/1986 | Greguss | 350/441 |
| 4,578,682 A | 3/1986 | Hooper et al. | 343/916 |
| 4,593,982 A | 6/1986 | Rosset | 354/99 |
| 4,602,857 A | 7/1986 | Woltz et al. | 352/84 |
| 4,656,506 A | 4/1987 | Ritchey | 358/87 |
| 4,661,855 A | 4/1987 | Gulck | 358/225 |
| 4,670,648 A | 6/1987 | Hall et al. | 250/216 |
| 4,728,839 A | 3/1988 | Coughlan et al. | 310/112 |
| 4,736,436 A | 4/1988 | Yasukawa et al. | |
| 4,742,390 A | 5/1988 | Francke et al. | 358/108 |
| 4,751,660 A | 6/1988 | Hedley | 364/518 |
| 4,754,269 A | 6/1988 | Kishi et al. | 340/729 |
| 4,761,641 A | 8/1988 | Schreiber | 340/717 |
| 4,772,942 A | 9/1988 | Tuck | 358/87 |
| 4,807,158 A | 2/1989 | Blanton et al. | |
| 4,835,532 A | 5/1989 | Fant | |
| 4,858,002 A | 8/1989 | Zobel | 358/98 |
| 4,858,149 A | 8/1989 | Quarendon | |
| 4,864,335 A | 9/1989 | Corrales | 354/99 |
| 4,868,682 A | 9/1989 | Shimizu et al. | 358/335 |
| 4,899,293 A | 2/1990 | Dawson et al. | |
| 4,901,140 A | 2/1990 | Lang et al. | 358/64 |
| 4,907,084 A | 3/1990 | Nagufusa | 358/171 |
| 4,908,874 A | 3/1990 | Gabriel | 382/41 |
| 4,918,473 A | 4/1990 | Blackshear | 354/81 |
| 4,924,094 A | 5/1990 | Moore | |
| 4,943,821 A | 7/1990 | Gelphman et al. | 354/99 |
| 4,943,851 A | 7/1990 | Lang et al. | 358/87 |
| 4,945,367 A | 7/1990 | Blackshear | 354/81 |
| 4,965,844 A | 10/1990 | Oka et al. | |
| D312,263 S | 11/1990 | Charles | D16/237 |
| 4,974,072 A | 11/1990 | Hasegawa | 358/80 |
| 4,985,762 A | 1/1991 | Smith | 358/87 |
| 4,991,020 A | 2/1991 | Zwirn | |
| 5,005,083 A | 4/1991 | Grage et al. | |
| 5,016,109 A | 5/1991 | Gaylord | 358/225 |
| 5,020,114 A | 5/1991 | Fujioka et al. | |
| 5,021,813 A | 6/1991 | Corrales | 354/82 |
| 5,023,725 A | 6/1991 | McCutchen | 358/231 |
| 5,038,225 A | 8/1991 | Maeshima | 358/461 |
| 5,040,055 A | 8/1991 | Smith | 358/87 |
| 5,048,102 A | 9/1991 | Tararine et al. | 382/41 |
| 5,067,019 A | 11/1991 | Juday et al. | 358/160 |
| 5,068,735 A | 11/1991 | Tuchiya et al. | 358/209 |
| 5,097,325 A | 3/1992 | Dill | 358/87 |
| 5,115,266 A * | 5/1992 | Troje | 354/95 |
| 5,130,794 A | 7/1992 | Ritchey | 358/87 |
| 5,142,354 A | 8/1992 | Suzuki et al. | 358/34 |
| 5,153,716 A | 10/1992 | Smith | 358/87 |
| 5,157,491 A | 10/1992 | Kassatly | |
| 5,166,878 A | 11/1992 | Poelstra | 364/424.01 |
| 5,173,948 A | 12/1992 | Blackham et al. | 382/44 |
| 5,175,808 A | 12/1992 | Sayre | 395/133 |
| 5,185,667 A | 2/1993 | Zimmermann | 358/207 |
| 5,187,571 A | 2/1993 | Braun et al. | 358/85 |
| 5,189,528 A | 2/1993 | Takashima et al. | 358/448 |
| 5,200,818 A | 4/1993 | Neta et al. | 358/87 |
| 5,231,673 A | 7/1993 | Elenga | 382/6 |
| 5,259,584 A | 11/1993 | Wainwright | 248/542 |
| 5,262,852 A | 11/1993 | Eouzan et al. | 358/87 |
| 5,262,867 A | 11/1993 | Kojima | 358/209 |
| 5,280,540 A | 1/1994 | Addeo et al. | |
| 5,289,312 A | 2/1994 | Hashimoto et al. | |
| 5,305,035 A | 4/1994 | Schonherr et al. | 354/96 |
| 5,311,572 A | 5/1994 | Freides et al. | |
| 5,313,306 A | 5/1994 | Kuban et al. | 348/65 |
| 5,315,331 A | 5/1994 | Ohshita | 354/94 |
| 5,341,218 A | 8/1994 | Kaneko et al. | 348/695 |
| 5,359,363 A | 10/1994 | Kuban et al. | 348/36 |
| 5,384,588 A | 1/1995 | Martin et al. | 348/15 |
| 5,396,583 A | 3/1995 | Chen et al. | 395/127 |
| 5,422,987 A | 6/1995 | Yamada | 395/127 |
| 5,432,871 A | 7/1995 | Novik | |
| 5,444,476 A | 8/1995 | Conway | |
| 5,446,833 A | 8/1995 | Miller et al. | |
| 5,452,450 A | 9/1995 | Delory | |
| 5,473,474 A | 12/1995 | Powell | 359/725 |
| 5,479,203 A | 12/1995 | Kawai et al. | |
| 5,490,239 A | 2/1996 | Myers | |
| 5,495,576 A | 2/1996 | Ritchey | 395/125 |
| 5,530,650 A | 6/1996 | Bifero et al. | |
| 5,539,483 A | 7/1996 | Nalwa | 353/94 |
| 5,601,353 A | 2/1997 | Naimark et al. | 353/122 |
| 5,606,365 A | 2/1997 | Maurinus et al. | |
| 5,610,391 A | 3/1997 | Ringlien | |
| 5,612,533 A * | 3/1997 | Judd et al. | 250/208.1 |
| 5,633,924 A | 5/1997 | Kaish et al. | |
| 5,649,032 A | 7/1997 | Burt et al. | 382/284 |
| 5,682,511 A | 10/1997 | Sposato et al. | |
| 5,686,957 A | 11/1997 | Baker et al. | |
| 5,714,997 A | 2/1998 | Anderson et al. | |
| 5,729,471 A | 3/1998 | Jain et al. | |
| 5,748,194 A | 5/1998 | Chen | |
| 5,760,826 A * | 6/1998 | Nayar | 348/36 |
| 5,761,416 A | 6/1998 | Mandet et al. | |
| 5,764,276 A | 6/1998 | Martin et al. | |
| 5,774,569 A * | 6/1998 | Waldenmaier | 382/100 |
| 5,796,426 A | 8/1998 | Gullichsen et al. | |
| 5,841,589 A * | 11/1998 | Davis et al. | 359/726 |
| 5,844,520 A | 12/1998 | Guppy et al. | |
| 5,850,352 A | 12/1998 | Moezzi et al. | |
| 5,854,713 A * | 12/1998 | Kuroda et al. | 359/850 |
| 5,877,801 A | 3/1999 | Martin et al. | 348/36 |
| 5,920,337 A * | 7/1999 | Glassman et al. | 348/36 |
| 5,920,376 A * | 7/1999 | Bruckstein et al. | 352/69 |
| 5,990,941 A | 11/1999 | Jackson et al. | |
| 6,002,430 A | 12/1999 | McCall et al. | |
| 6,144,406 A * | 11/2000 | Girard et al. | 348/211 |

OTHER PUBLICATIONS

Defendants IPI's Composit Exhibit List, Civil Action of Interative Pictures Corporation, F/K/A Omniview, Inc. v. Infinite Pictures, Inc. and Bill Tillman, Case No. 3–96–849. Filed: Jan. 5, 1998, in U.S.D.C., Eastern District of Tennessee. pages 2.

Plaintiff's Rule 26(a)(3) Disclosures, Civil Action of Interactive Pictures Corporation, F/K/A Omniview, Inc. v. Infinite Pictures, Inc. and Bill Tillman, Case No. 3–96–849; 31 Pages. Filed: Dec. 8, 1997, in U.S.D.C., Eastern District of Tennessee.

Plaintiff's Supplemental Trial Exhibit List, Civil Action of Interactive Pictures Corporation, F/K/A Omniview, Inc. v. Infinite Pictures, Inc. and Bill Tillman, Case No. 3–96–849; 41 Pages. Filed: Jan. 2, 1998, in U.S.D.C., Eastern District of Tennessee.

Ripley G. David, "DVI–A Digital Multimedia Technology". Communication of the ACM. Jul. 1989. vol. 32. No.07. Pp. 811–820.

Onoe M. and Kuno Y., "Digital Processing CF Images Taken By Fish–Eye Lens". IEEE. pp. 105–108.

Hamit, F. "Near–Fisheye CCD camera Broadens View for Imaging". Advanced Imaging. Mar. 1993. pp. 50–52.

Dixon, D., Golin, S., and Hasfield, I., "DVI Video/Graphics". Computer Graphics World reprinted from the Jul. 1987 edition of Computer Graphics World. p. 4.

Upstill, Steve. "Building Stronger Images". UNIX Review. Oct. 1988. vol. 06. No. 10. pp. 63–73.

Greene, N., "Environment Mapping and Other Applications of the World Projections." Computer Graphics and Applications, Nov. 1986. IEEE Computer Society. vol. 06. No. 11. pp. 21–29.

Hechbert P., "The PMAT and Poly User's Manual". Computer Graphics Lab. N.Y.I.T., Feb. 18, 1983. pp. 1–29.

Heckbert, P., Fundamentals of textured Mapping and Image Warping. Master Thesis, p. 86. Dated: Jun. 17, 1989.

Rebiai,M., Mansouri, S., Pinson, F., and Tichit, B., "Image Distortion From Zoom Lenses: Modeling and Digital Correction". International Broadcasting Convention. IEEE, Dated: Jul. 1992.

Charles Jeffery, R., "All–Sky Reflector with "Invisible" Camera Support". Images from 1988 RTMC Proceedings, pp. 79–80.

Roger W. Sinnott, "Scientific Library Gleaning for ATMs". Sky & Telescope. Aug. 1986. p. 186.

Charles et al., "How to Build and Use an All–Sky Camera." Astronomy. Apr. 1987. pp. 64–70.

Deutsch, Cludia H., "One Camera That Offers Many Views". The New York Times.

Johnson, Colin R., "Imaging System Sees All". Electronic Engineering Times. Dec. 25, 1996. pp. 1&98.

"Panospheric Camera Expands Horizon". p. 01.

"Panoshperic Camera Developed at Carnegie Mellon Expands Horizon". p. 01.

Castleman, K., "Digital Image Processing". Prentice Hall. 1979. pp. 110–135, 383–400, 408.

Castleman, K., "Digital Image Processing". Prentice Hall. 1996. pp. 125–127, 140–141.

Shah, S., A Simple Calibration Procedure For Fish–Eye (High Distortion) Lens. IEEE. 1994. pp. 3422–3427.

"Gnomonic Projection". Map Projections–A Working Manual. pp. 164–168.

Greene, N., and Heckbert, P. "Creating Raster Ominmax Images From Multiple Perspective Views Using The Elliptical Weighted Average Filter". IEEE. 1986. pp. 21–27.

Fant, K., "A Nonaliasing, Real–Time Spatial Formation Technique". IEEE. 1986. pp. 71–80.

Green, William B., "Qualitative Image Processing Techniques". Digital Image Processing, A Systems Approach. $2^{nd}$ Edition. 1989. Van Nostrand Reinhold. pp. 92–112.

Wolberg, George. Digital Image Warping (introduction). 1990. IEEE Computer Society Press. p. 2.

Fu, K.S. et al., "Low–Level Vision". Robotics: Control, Sensing, Vision, and Intellgence. 1987.McGraw Hill Inc., pp. 313–315.

Carlbom, Ingrid et al. "Planner Geometric Projections and Viewing Trasformations", Computing Surveys. vol. 10. No. 04. Dec. 1978. pp. 465–502.

Anderson, R.L., et al., "Omnidirectional Real time Imaging Using Digital Restoration". High Speed Photography SPIE. vol. 348. San Diego, CA. 1982. pp. 807–814.

Laikin, Milton. "Wide Angel Lens System". 1980. International Design Conference (OSA). SPIE. vol. 237. 1980. pp. 530–532, 815–816.

Shah, Shisir et al., "Depth Estimation using Fish–Eye Lenses". IEEE. Department Of Electrical and Computer Engineering. University of Texas. 1994. pp. 740–744.

Tsai, Roger Y., "A Versatile Camera Calibration Technique for High Accuracy 3–D Machine Vision Using Off–the–Shelf TV Cameras and Lenses". IEEE. Journal of Robotics and Automation. vol. RA–3. No. 04. Aug. 1987. pp. 323–344.

Chang, Yuh–Lin et al., "Calibrating a Mobile Camera's Parameters". Pattern Recognition. vol. 26. No. 01. Dated: 1983. pp. 75–88.

Weng, Juyang. "Camera Calibration With Distortion Models and Accuracy". IEEE. Transactions On Pattern Analysis and Machine Intelligence. vol. 14. No. 10. Oct. 1992. pp. 965–980.

Lenz, Reimer K. et al., "Techniques for Calibration of the Scale Factor and Image Center for High Accuracy 3–D Machine Vision Metrology". IEEE. Transaction on Pattern Analysis and Machine Intelligence. vol. 05. No. 05. Sep. 1988. pp. 713–720.

Nomura, Yoshihiko, et al., "A Simple Calibration Algorithm for High–Distortion Lens Camera". IEEE. Transaction on Pattern Analysis and Intelligence Machine. vol. 14. No. 11. Nov. 1992. pp. 1095–1099.

International Broadcasting Convention Venue RAI Congress And Exhibition Centre, Amersterdam, The Netherlands. Jul. 3–7, 1992. pp.: 06, Including the title page.

Telerobotics International, Inc. "Optimizing The Camera And Positioning System For Telerobotic Workcite Viewing".

Miyamoto, K., "Fish Eye Lens". JOSA. vol. 54. pp. 1060–1061. Dated: Aug. 1964.

Defendant's IPI's Composite Exhibit List, Civil Action of Interactive Pictures Corporation, F/K/A Omniview, Inc. v. Infinite Pictures, Inc. and Bill Tillman. Case No. 3–96–849. Filed: Jan. 5, 1998 in U.S.D.C., Eastern District Of Tennessee. p. 20.

Baltes, M. "Bevet D'Intervention". Ref. No.: N 1.234.341.

Verity, John W. (edited by): Information Processing Business Week. p. 134E Dated Jul. 13, 1992.

Marbach, William D (edited by): Developments To Watch. Business Week. p. 83. Dated Sep. 26, 1988.

Lu Carnevale, Mary. Video Camera Puts The Viewer in Control. Wall Street Journal. Dated: Nov. 25, 1992.

Popular Science. Electronic Panning Camera System. pp. 36–37. Dated Sep. 1992.

Tulloch, Martha. "New Video Camera . . . " Photonics Spectra. pp. 18–20. Dated Oct. 1992.

Fisher, Timothy E., A PROGRAMMABLE Video Image Ramapper. SPIE> vol. 938. pp. 122–128. Dated: 1988.

Lippman, Andrew. Movie–Map: An Application Of The Optical Videodisc To Computer Graphics. p. 43. Dated: 1980.

Yelick, Steven. Anamorphic Image Processing. pp. 1–37, Including Acknowledgement Page. Dated: 1980.

Chen, Shenchang Eric. Quick Time VR–An Image–Based Approach To Virtual Environment Navigation. p. 39. Dated 1995.

* cited by examiner

METHOD AND APPARATUS FOR IMPLEMENTING A PANOPTIC CAMERA SYSTEM

FIELD OF THE INVENTION

The present invention relates to the field of film and video photography. In particular the present invention discloses a panoptic camera device that captures virtually all the light that converges on a single point in space.

BACKGROUND OF THE INVENTION

Most cameras only record a small viewing angle. Thus, a typical conventional camera only captures an image in the direction that the camera is aimed. Such conventional cameras force viewers to look only at what the camera operator chooses to focus on. Some cameras use a specialized wide angle lens or "fish-eye" lens to capture a wider panoramic image. However, such panoramic cameras still have a relatively limited field.

In many situations, it would be much more desirable to have a camera system that captures light from all directions. For example, a conventional surveillance camera can be compromised by a perpetrator that approaches the camera from a direction that is not within the viewing angle of the camera. An ideal surveillance camera would capture light from all directions such that the camera would be able to record an image of a person that approaches the camera from any direction.

It would be desirable to have a camera system that would capture the light from all directions such that a full 360 degree panoramic image can be created. A full 360 degree panoramic image would allow the viewer to choose what she would like to look at. Furthermore, a full 360 degree panoramic image allows multiple viewers to simultaneously view the world from the same point, with each being able to independently choose their viewing direction and field of view.

SUMMARY OF THE INVENTION

The present invention introduces a panoptic camera system that can be used to capture all the light from a hemisphere viewing angle. The panoptic camera comprises a main reflecting mirror that reflects light from an entire hemisphere onto an image capture mechanism. The main reflecting mirror consists of a paraboloid shape with a dimple on an apex. The surface area around the dimple allows the main reflector to capture light from behind an image capture mechanism or a second reflector. When two panoptic camera systems that capture the light from an entire hemisphere are placed back to back, a camera system that "sees" light from all directions is created.

A stereo vision panoramic camera system is also disclosed. The stereo vision panoramic camera system comprises two panoramic camera systems that are separated by a known distance. The two panoramic camera systems are each placed in a "blind spot" of the other panoramic camera system. By using the different images generated by the two panoramic camera systems and the known distance between the two panoramic camera systems, the range to objects within the panoramic images can be determined.

Other objects feature and advantages of present invention will be apparent from the company drawings and from the following detailed description that follows below.

BRIEF DESCRIPTION OF THE DRAWINGS

The objects, features and advantages of the present invention will be apparent to one skilled in the art, in view of the following detailed description in which:

FIG. 4b is a conceptual diagram used to illustrate the shape of the panoptic camera system in FIG. 4a.

DETAILED DESCRIPTION OF THE PREFERRED EMBODIMENT

A method and apparatus for implementing a panoptic camera is disclosed. The following description, for purposes of explanation, specific nomenclature is set forth to provide a thorough understanding of the present invention. However, it will be apparent to one skilled in the art that these specific details are not required in order to practice the present invention. For example, the present invention has been described with reference to Ethernet based computer networks. However, the same techniques can easily be applied to other types of computer networks.

A Panoptic Camera

Figure 1:
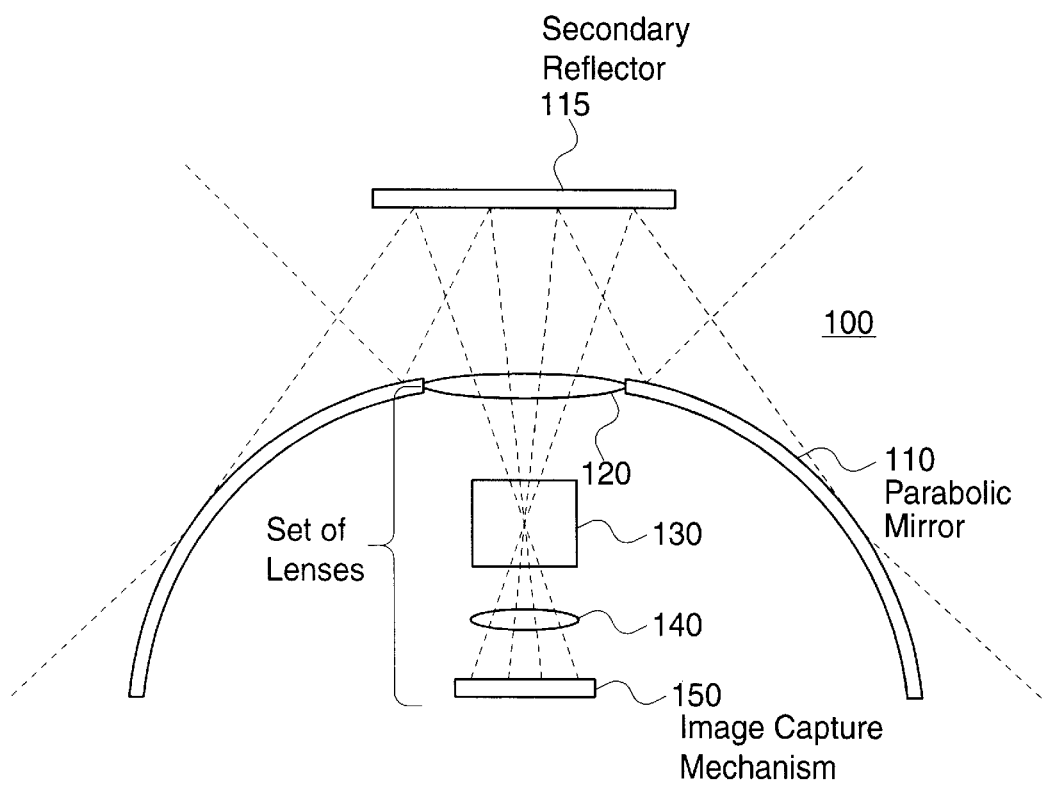
FIG. 1 illustrates one embodiment of a panoramic camera system.

FIG. 1 illustrates a cross section view of panoramic camera system 100 that captures an image of the surrounding panorama. It should be noted that the camera system is cylindrically symmetrical such that it captures light from a 360 degree band around a point.

The panoramic camera system 100 operates by reflecting all the light from a 360 degree band with a parabolic reflector 110 to a second reflector 115 through a set of lenses 120, 130, and 140 to an image capture mechanism 150. The set of lenses corrects various optical artifacts created by the parabolic mirror. The image capture mechanism 150 may be a chemical based film image capture mechanism or an electronic based image capture mechanism such as a CCD. Details on how to construct such a panoramic camera can be found in the U.S. patent application titled "Panoramic Camera" filed on May 8, 1997, with Ser. No. 08/853,048.

Figure 2A:
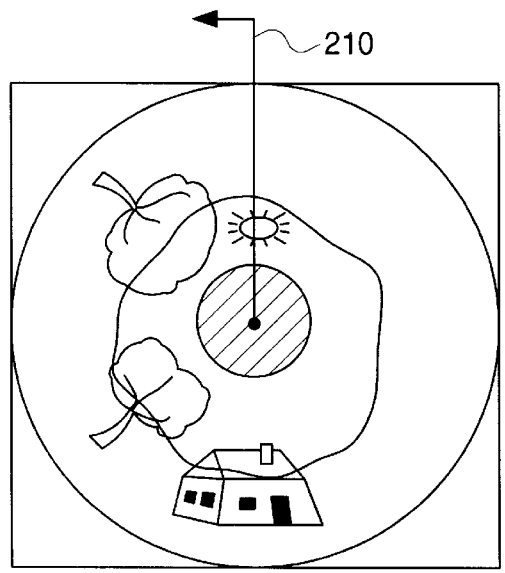
FIG. 2a illustrates an annular image that is recorded by the panoramic camera system of FIG. 1.
Figure 2B:
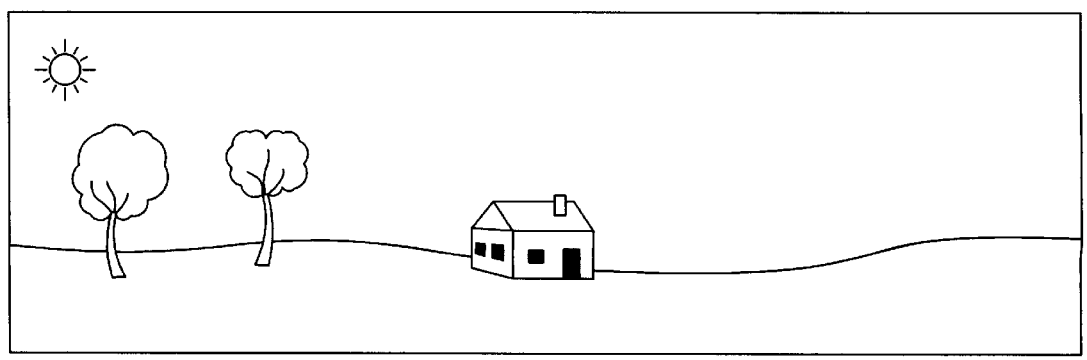
FIG. 2b illustrates how the annular image of FIG. 2a appears after it has been unwrapped by polar to rectangular mapping software.

FIG. 2a illustrates how an image captured by the panoramic camera system 100 of FIG. 1 appears. As illustrated in FIG. 2a, the surrounding panorama is captured as an annular image on a two dimensional surface. The annular image can later be processed by an optical or electronic image processing system to display the image in a more familiar format. FIG. 2b illustrates how the annular image of FIG. 2a appears after it has been geometrically transformed from the annular image into a rectangular image by image processing software. In one embodiment, the transformation approximates a transform from polar coordinates to rectangular coordinate.

Figure 3:
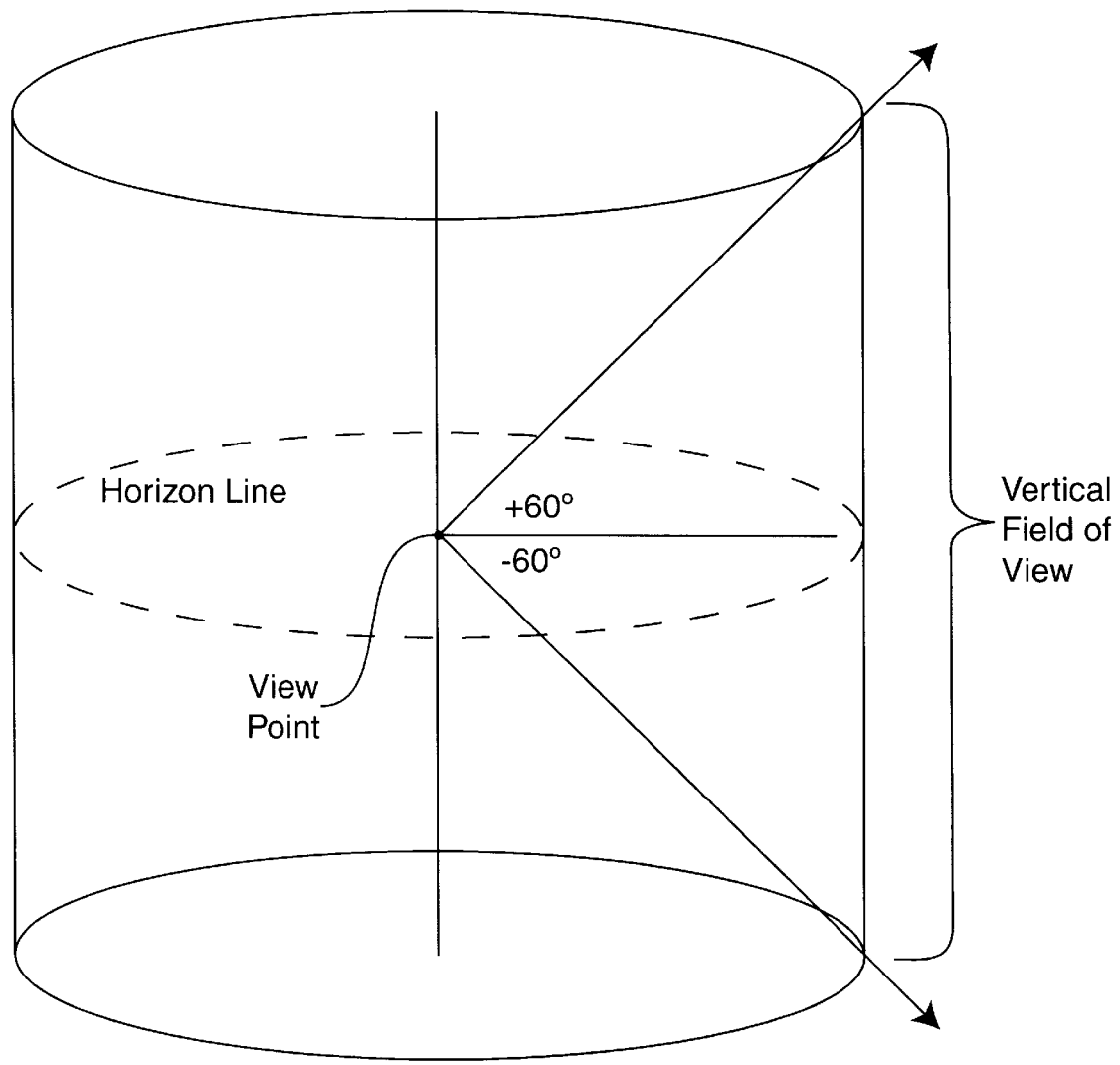
FIG. 3 graphically illustrates the 360 degree band of light that is captured by the panoramic camera system of FIG. 1.

FIG. 3 graphically illustrates the band of light that is captured by the panoramic camera system of FIG. 1. As illustrated in FIG. 3, the panoramic camera system of FIG. 1 captures a 360 degree band of light that is 60 degrees above and below the horizon.

Camera System that Collects all Light from a Hemisphere

In certain applications, it would be desirable to have a camera system that collects all the light from a full hemisphere around the camera. For example, a camera system that collects all the light from a full hemisphere could be used by astronomers to capture an image of the entire night sky.

Figure 4A:
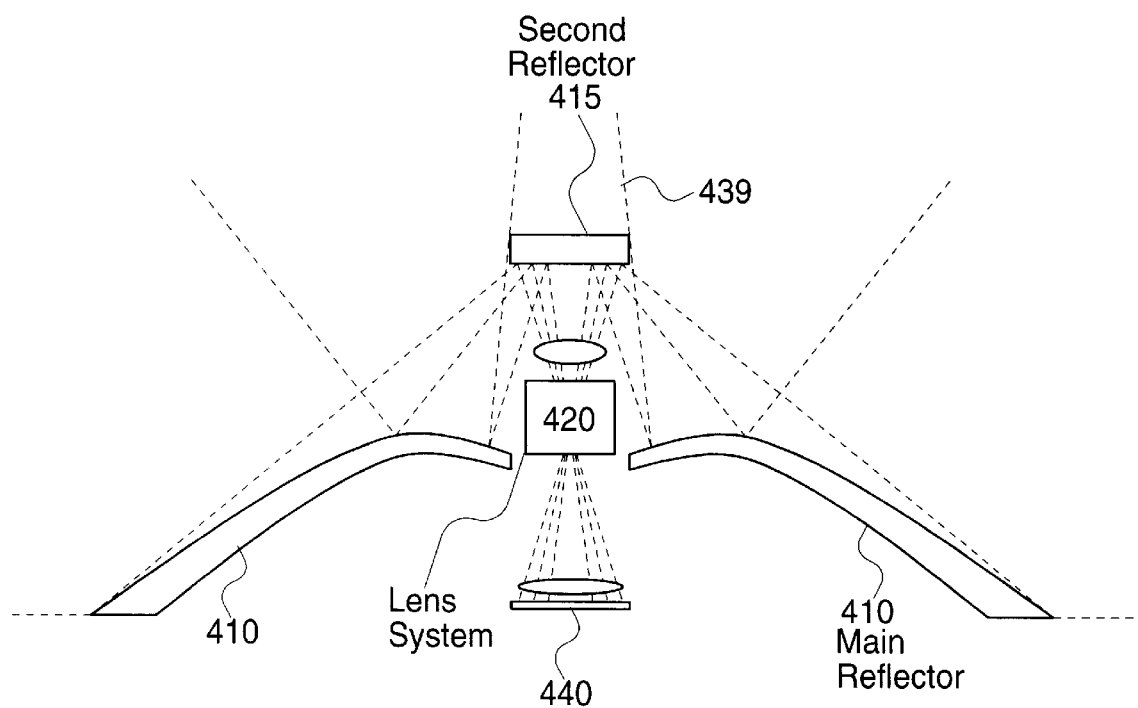
FIG. 4a illustrates an embodiment of a panoramic camera system that captures all the light from a hemisphere above and around the panoramic camera system.

FIG. 4a illustrates a camera system similar to camera system of FIG. 1 except that the camera system of FIG. 4a captures light from the horizon line all the way to the Zenith. Thus, the camera system of FIG. 4a captures light from the entire hemisphere above the camera system.

The camera system operates by having a main reflector 410 that reflects light from the entire hemisphere above the camera system to a second reflector 415. The second reflector 415 reflects the light down through a lens system 420 to an image capture mechanism 440.

Figure 4B:
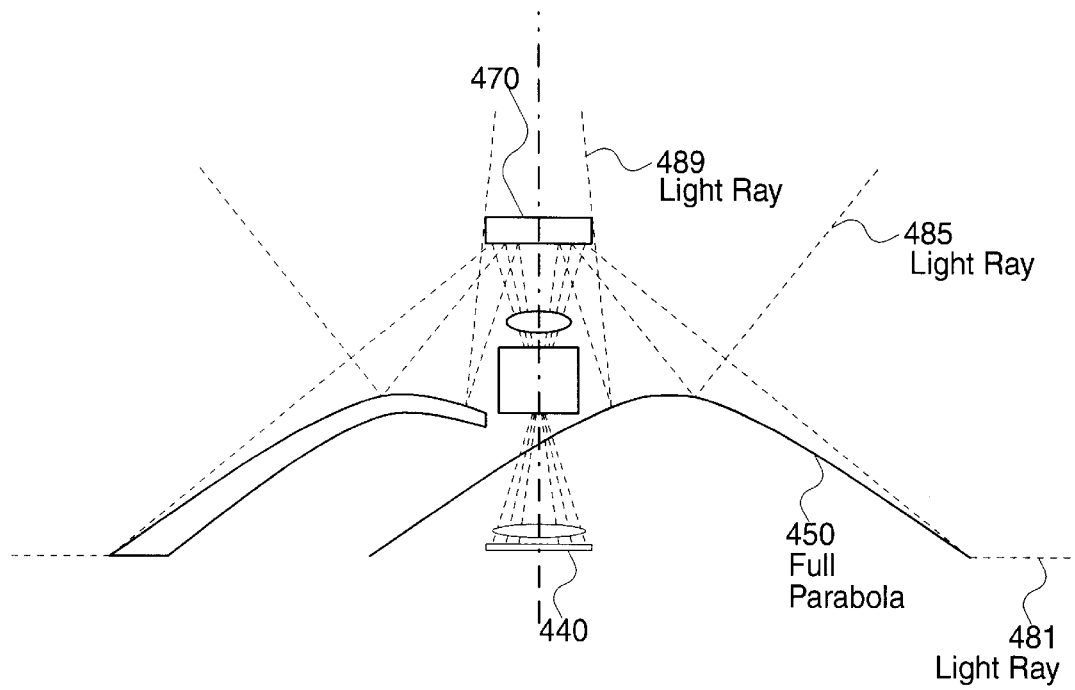

To be able to collect light from a full hemisphere, the main reflector of the camera system consists a cylindrically symmetric mirror with a cross section that consists of an offset parabola. FIG. 4b illustrates the shape of a full parabola 450 that is then cut shortly after the apex on the side of the parabola near the center of the main reflector. The offset parabola reflects light from a slightly greater than 90 degree band that starts at the horizon (see light ray 481) and continues to the zenith (see light rays 485 and 489) and beyond. The short section of parabola near the center of the main reflector allows the main reflector to direct light from the zenith and beyond to the second reflector 470 and down into the image capture mechanism 440. This is illustrated by light ray 489.

Although the main reflector 410 of FIG. 4a captures light from the zenith and beyond, the main reflector has a slight "blind spot." The blind spot is limited to being a small cone of space behind the second reflector 415 inside light ray 439. This small area in the blind spot can be used to implement a support fixture for the mirror. Alternatively, the small area in the blind spot can be used to implement supplemental lighting.

Camera System that Collects Light from all Directions

For some applications, it would be desirable to have a camera system that collects all the light that converges on a point from all directions. For example, an ideal security camera system would be able to "see" in all directions such that no perpetrator could sneak up on the camera from an angle not seen by the camera. Thus, no perpetrator could sneak up on the camera and disable the camera without having his image captured by the camera.

Figure 5:
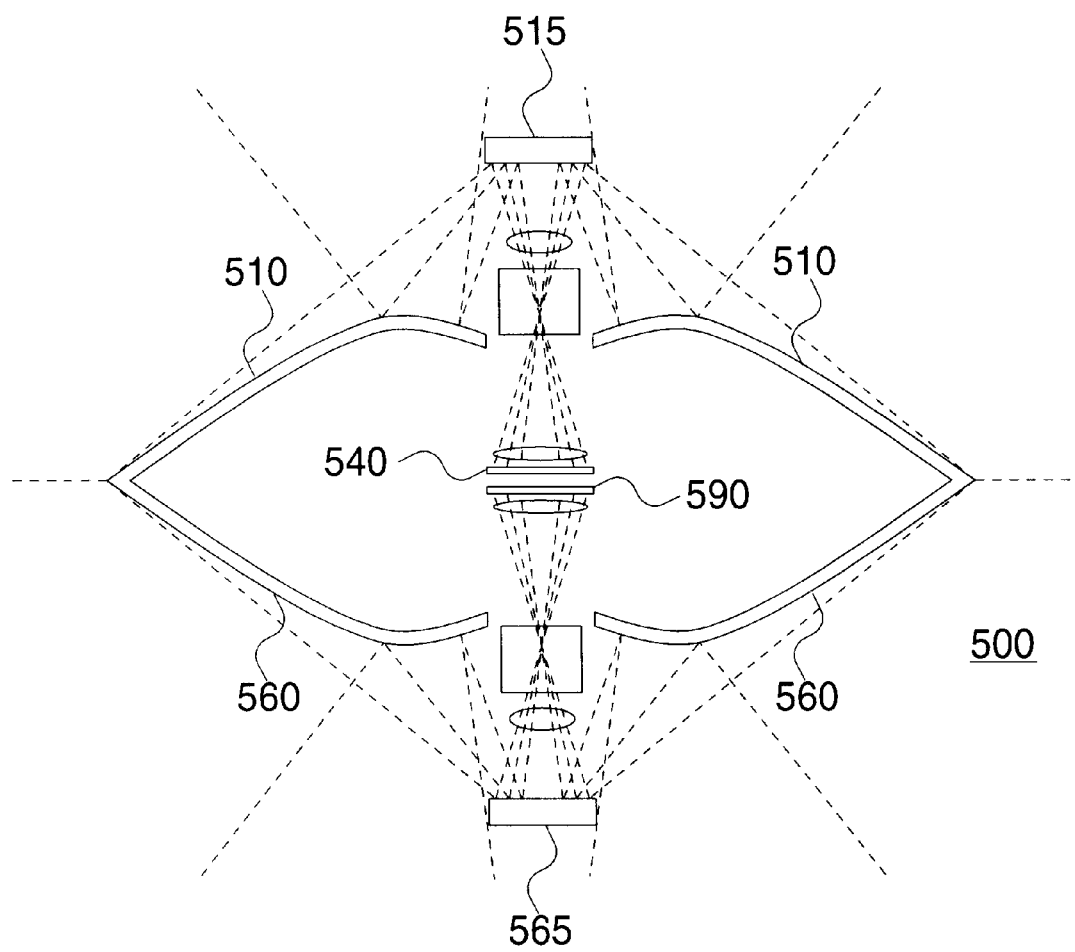
FIG. 5 illustrates an embodiment of a panoramic camera system that captures light from all directions around the panoramic camera system.

To construct a panoptic camera system that collects light from all directions, the present invention discloses an arrangement of two hemisphere camera systems joined together as illustrated in FIG. 5. The arrangement of FIG. 5 will produce two annular images: one annular image for the upper hemisphere and one annular image for the lower hemisphere. Since the two camera systems are aligned with each other, the two annular images can be optically or electronically combined to generate an image of the entire surroundings of the panoptic camera system.

A Panoramic Camera System with Stereo Vision

To gauge the range of visible objects, humans uses stereo vision. Specifically, the two different view angles provided by two eyes enables a human to determine the relative distance of visible objects. The same principle can be used to implement a panoramic camera system that has stereo vision.

A First Embodiment

Figure 6:
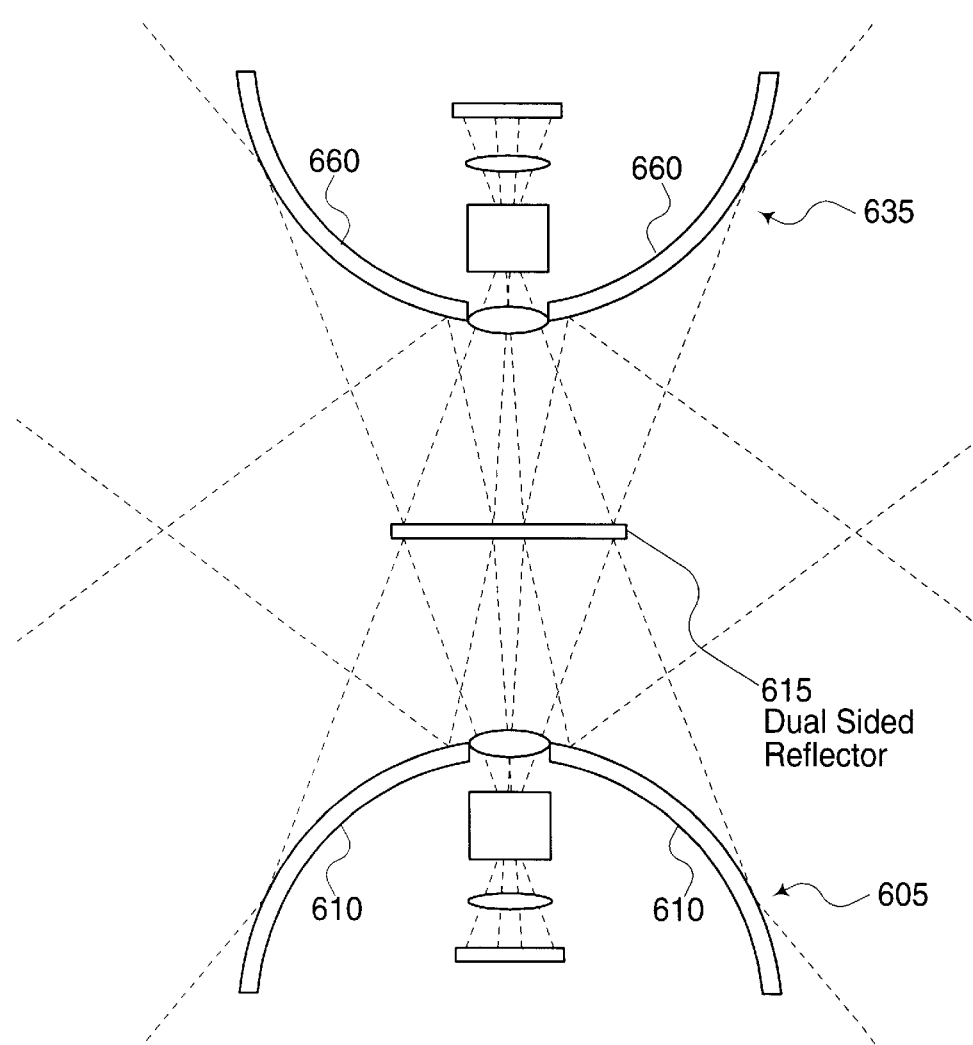
FIG. 6 illustrates a first embodiment of a panoramic camera with stereo vision.

Referring back to FIG. 1, the original panoramic camera has a blind spot above the second reflector. The blind spot is clearly illustrated in FIG. 3 wherein the area above 60 degrees above the horizon and the area below 60 degrees below the horizon are not captured by the panoramic camera system. A second panoramic camera can be placed in a blind spot of a first panoramic camera. FIG. 6 illustrates a stereo vision panoramic camera system constructed according to this technique.

The stereo panoramic camera system of FIG. 6 comprises a first panoramic camera 605 and a second inverted panoramic camera 635. Each panoramic camera system 605 and 635 is in a blind spot of the other panoramic camera system. By spatially separating the two panoramic camera systems, each panoramic camera system will record a slightly different annular image of the surrounding panorama. Using the known distance between the two panoramic camera systems and the two different annular images, the distance to objects within the annular images can be determined.

In the embodiment displayed in FIG. 6, the two panoramic camera systems use a single dual sided reflector 615 to reflect the panoramic image from the main reflector into the respective image capture mechanisms. In an alternate embodiment (not shown), two panoramic camera systems can be placed in the other blind spot such that the two panoramic camera systems are arranged in a manner similar to the arrangement of FIG. 5.

Another Stereo Vision Embodiment

Figure 7:
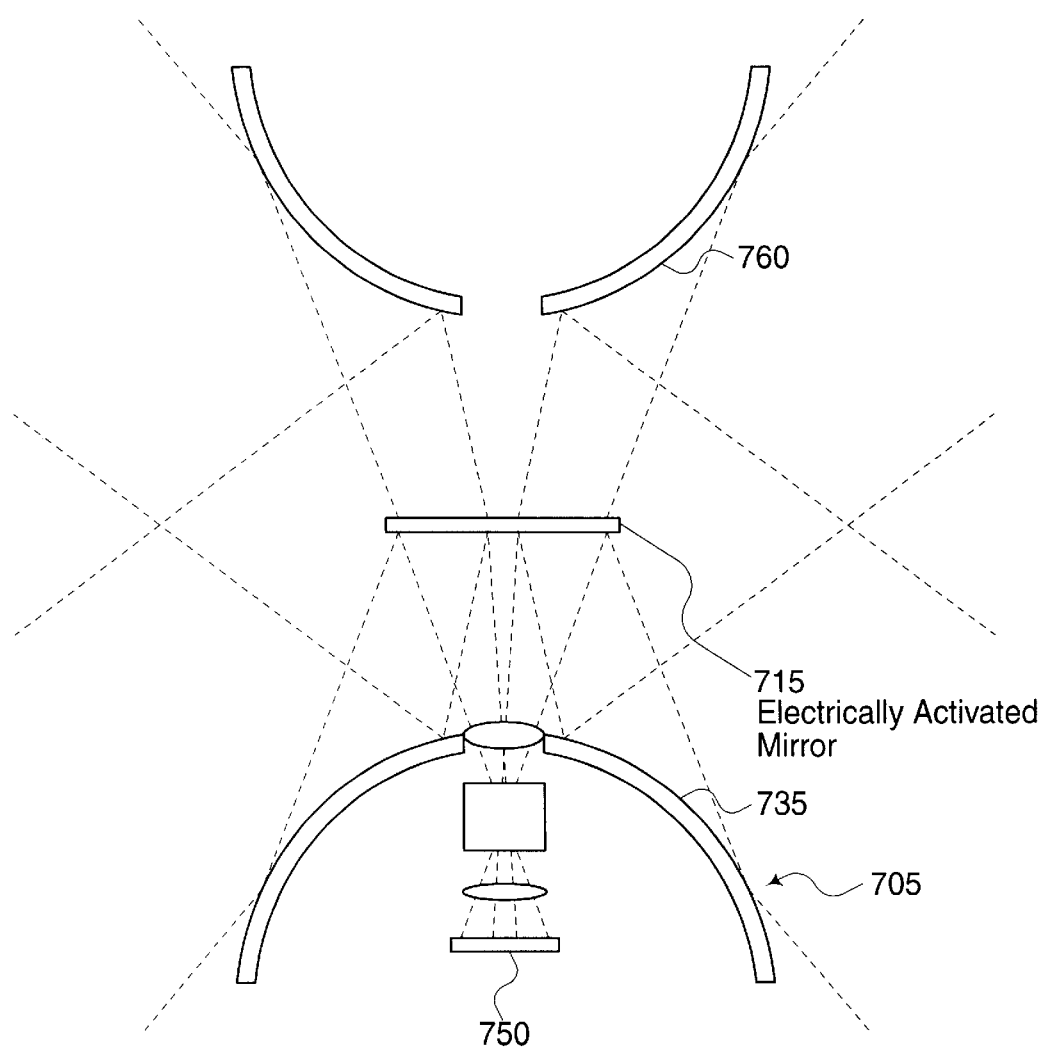
FIG. 7 illustrates a second embodiment of a panoramic camera with stereo vision.

FIG. 7 illustrates yet another embodiment of a stereo vision panoramic camera system. In the embodiment of FIG. 7, a single image capture mechanism 750 is used to capture two slightly different panoramic images.

The stereo vision panoramic camera of FIG. 7 captures a first panoramic annular image using a first main reflector 735 and a second reflector 715 in the same manner described with reference to FIG. 1. However, the second reflector 715 in the stereo vision panoramic camera system of FIG. 7 is an electrically activated mirror. The stereo vision panoramic camera system of FIG. 7 also features a second main reflector 760 that is positioned at the correct position for an optical path that does not require a second reflector. Thus, by deactivating the electrically activated second reflector 715, the stereo vision panoramic camera system captures a second panoramic annular image using the second main reflector 760. The two panoramic annular images can be combined to deliver a stereo image of the surrounding panorama.

Panoramic Camera System with Protective Shield

When collecting light reflected off the main reflector of a panoramic camera system, it is desirable to eliminate any influence from light from other sources. For example, ambient light should not be able to enter the optical system that is intended only to collect the panoramic image reflected off of the main reflector.

Figure 8:
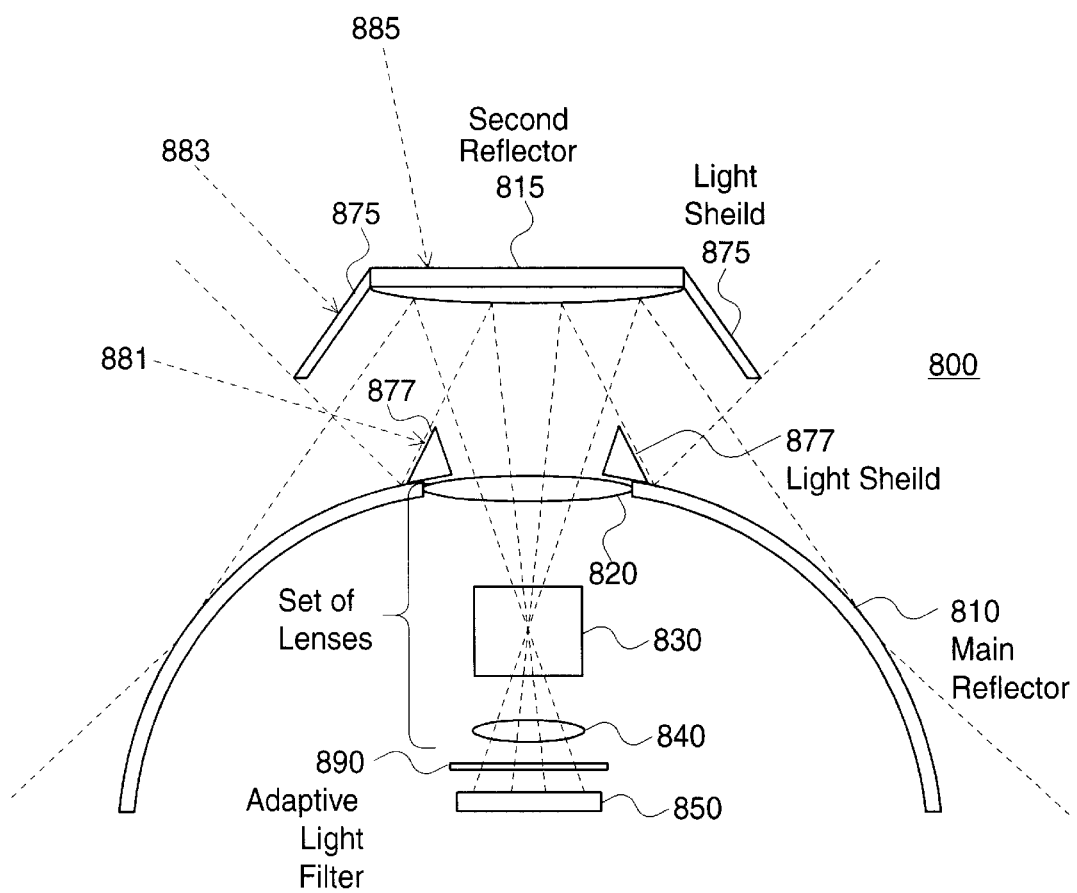
FIG. 8 illustrates an embodiment of a panoramic camera system that shields unwanted light and limits the amount of light that reaches the image plane.

FIG. 8 illustrates a cross-section view of an improved panoramic camera system 800 the collects only the light from the reflected panoramic image. It should be noted that the real panoramic camera system is cylindrically symmetrical. The panoramic camera panoramic camera system 800 uses two light shields (875 and 877) to block all light that is not from the reflected image off of the main reflector.

The first light shield 875 is mounted on top of the second reflector 815 that reflects the panoramic image on the main reflector 810 down into the optical path of the camera system. The first light shield 875 prevents light from above the panoramic camera's maximum vertical viewing angle. In one embodiment, the panoramic camera's maximum vertical viewing angle is 50 degrees such that the first light shield 875 prevents light coming from an angle greater than 50 degree from entering the panoramic camera's optical path.

The second light shield 877 is placed around the opening of the panoramic camera's lens system. The second light shield prevents light from entering the camera's optical path unless that light has reflected off the main reflector 810 and has reflected off the second reflector 815 down into the optical path.

FIG. 8 also illustrates that the second reflector 815 can be constructed using a convex mirror instead of the flat mirror. By using a convex mirror as the second reflector, the second reflector can be placed closer to the main body of the camera system.

Overexposure Control

A panoramic camera system must be able to handle a much wider variety of lighting conditions than a conventional (limited viewing angle) camera system. A conventional camera system only captures light from a small viewing angle such that the intensity of light from the viewing angle will probably not vary a great amount. However, a panoramic camera system captures light from all directions such that the wide variety of lighting conditions must be handled. For example, with a panoramic camera system light from a first direction may come directly from the sun and in another light from a second direction may consist of ambient light reflected off of an object in a shadow. To capture a high quality panoramic image, it would be desirable to adjust the amount of light captured from each viewing direction such that the light exposure from the different directions does not vary wildly.

FIG. 8 illustrates a panoramic camera constructed to limit the light received from the different directions. To adjust the amount of light captured from each direction, the panoramic camera system 800 includes an adaptive light filter 890 in the optical path of the panoramic camera system. The adaptive light filter 890 limits the amount of light that reaches the image capture mechanism 850.

In the illustration of FIG. 8, the adaptive light filter 890 is placed just before the image capture mechanism 850. This position minimizes the detrimental effects caused by any scattering of light by the adaptive light filter 890. However, the adaptive light filter 890 can be placed at any point in the optical path of the panoramic camera system.

A Passive Filtering System

One method of implementing an adaptive light filter 890 is to use a normally transparent light sensitive material that darkens when the material is exposed to large quantities of light. For example, a refractive neutral lens made of photogray material would automatically limit the amount of light from high intensity viewing directions. Examples of photogray glass include PhotoGray Extra and PhotoGray II made by Corning Glass Works of Corning, New York.

An Active Filtering System

Another method of implementing an adaptive light filter 890 is to use an electronically controlled Liquid Crystal Display (LCD) array as an adaptive light filter 890. Ideally, the LCD array would be capable of selectively adjusting the amount of light that passes through any point of the LCD array.

To control the LCD array, an LCD control circuit (not shown) would be coupled to the electronic image capture mechanism 850 of the panoramic camera system 800. The electronic image capture mechanism 850 would determine the relative light intensity at each point on the electronic image capture mechanism. The light intensity information from the electronic image capture mechanism 850 is passed to the LCD control circuit that determines how the LCD array should limit the light that passes through. Specifically, when the electronic image capture mechanism 850 detects an area that is receiving high intensity light, then the LCD control circuit would darken the corresponding area on the LCD array. Thus, the LCD array would selectively reduce the amount of light that reaches the image capture mechanism from high light intensity directions. The "flattening" of the light intensity results in captured panoramic annular images with greater contrast.

A Solid Camera Embodiment

The panoramic camera system illustrated in FIG. 8 uses an outer surface mirror for the main reflector. An outer surface mirror is used since an inner surface mirror protected by a transparent material would have refractive effects caused when the light enters the transparent material and when the light exits the transparent material. Since the panoramic camera system illustrated in FIG. 8 uses an outer surface mirror, the camera must be used cautiously to prevent damage to the out mirror surface. It would therefore be desirable to implement a panoramic camera that protects the main reflector.

Figure 9:
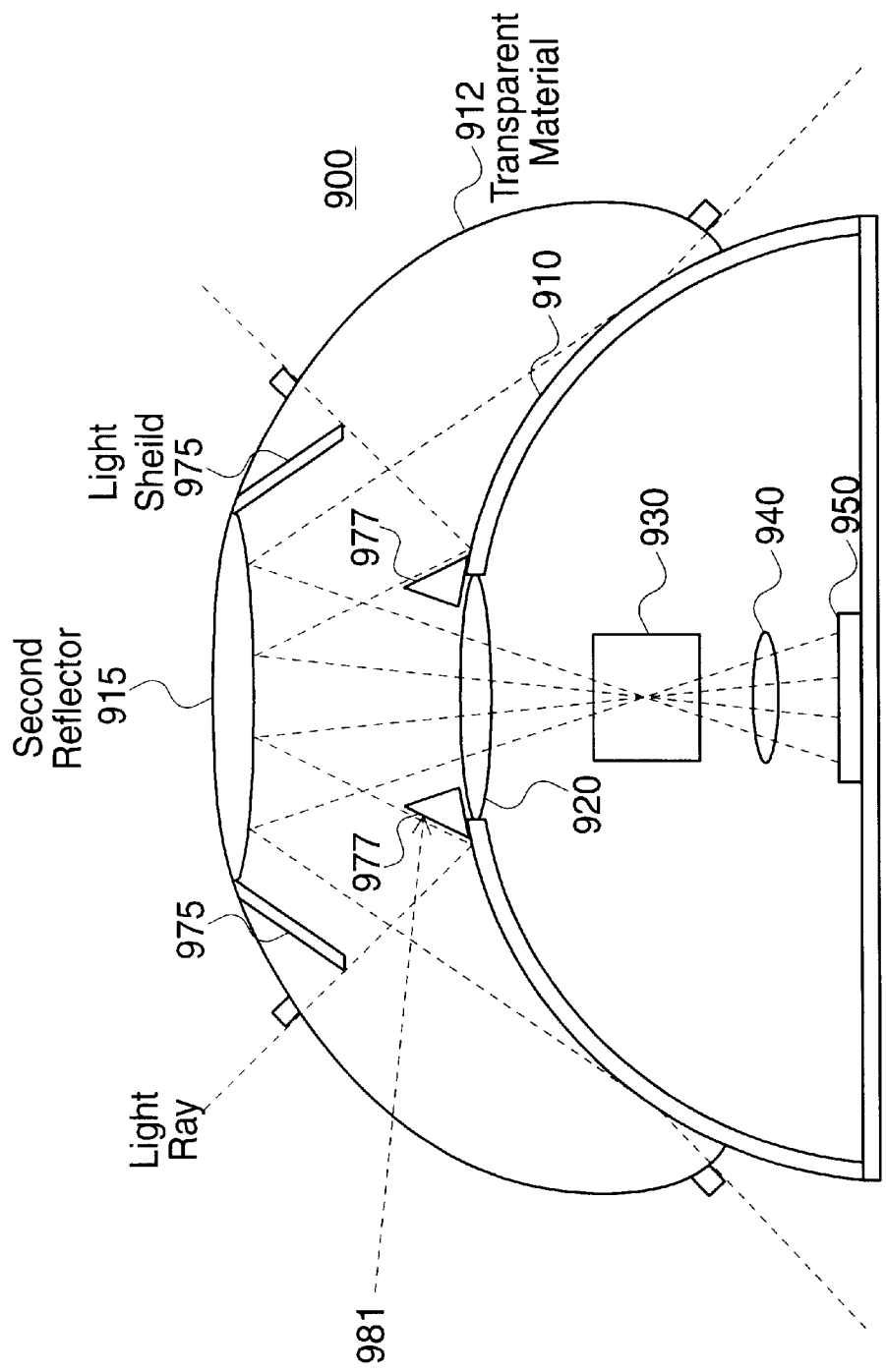
FIG. 9 illustrates an embodiment of a panoramic camera that is constructed using a solid transparent material such that the inner components are protected.

FIG. 9 illustrates an embodiment of a panoramic camera system constructed of a solid transparent block. In the embodiment of FIG. 9, the main reflector 910 is protected by a transparent material 912. The transparent material 912 is shaped such that all the light that will be used to create the annular reflection of the surrounding panorama enter the transparent material 912 at a normal to the surface of the transparent material 912 as illustrated by the right angle marks on the light rays. Since the light rays that create the annular image enter at a normal to the surface, there is no refractive effect as the light enters the transparent material 912. The outer surface of the transparent material 912 is coated with a multicoat material such that internal reflections are prevented.

Once a light ray that will form part of the panoramic image enters the transparent material 912, the light ray then reflects off the main reflector 910 and then reflects off the second reflector 915 and then exits the transparent material 912 at surface 920. Thus, the light remains in the transparent material 912 until it enters the lens system. The surface 920 can be shaped such that all light that is part of the annular image exits at a normal to the surface 920 such that the transparent material 912 has no refractive effect on the light. Alternatively, the surface 920 can be shaped such that surface 920 is part of the lens system.

The embodiment in FIG. 9 includes two light shields 975 and 977 to prevent undesired light from entering the optical path. It should be noted that the panoramic camera system can also be constructed with the light shields 975 and 977.

Annular Image Processing

As previously described, the panoramic annular images can be geometrically transformed from the annular image into more conventional rectangular projections. One method of performing this operation is to use digital image processing techniques as described in the relate U.S. patent titled "Panoramic Camera" filed on May 8, 1997, with Ser. No. 08/853,048.

When photographic film is used to capture the annular images, the annular images will not always be recorded in the exact same position on the film. One reason for this is that sprockets used to advance film through a camera are slightly smaller that the correspond holes in the film. Thus, the film alignment between exposures tends to vary. This effect is known as "gate weave."

Figure 10A:
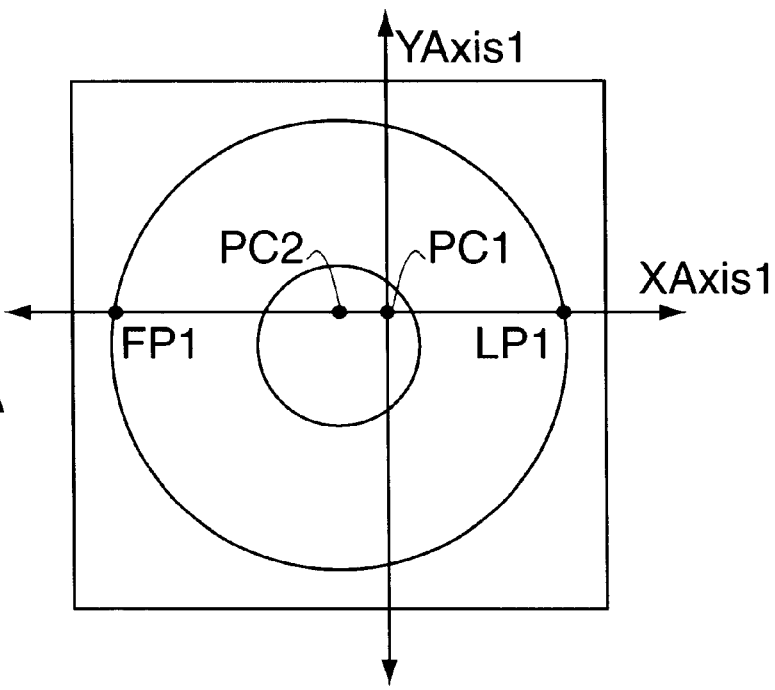
FIGS. 10a and 10b graphically illustrate a method of locating the center of a annular panoramic image.
Figure 10B:
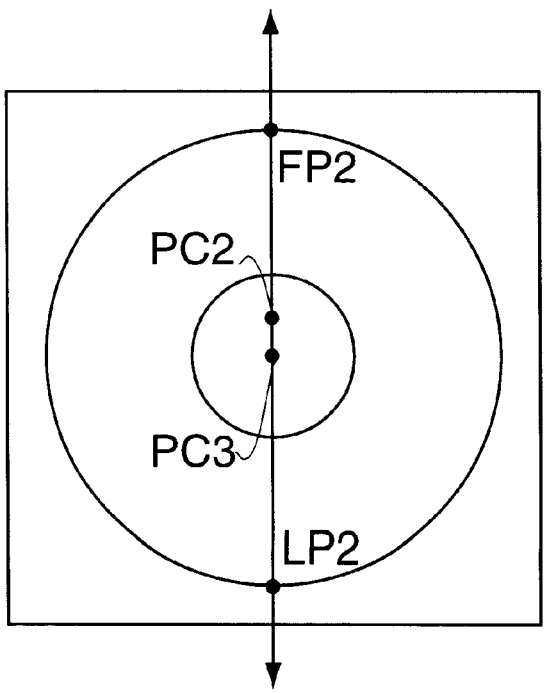
Figure 11A:
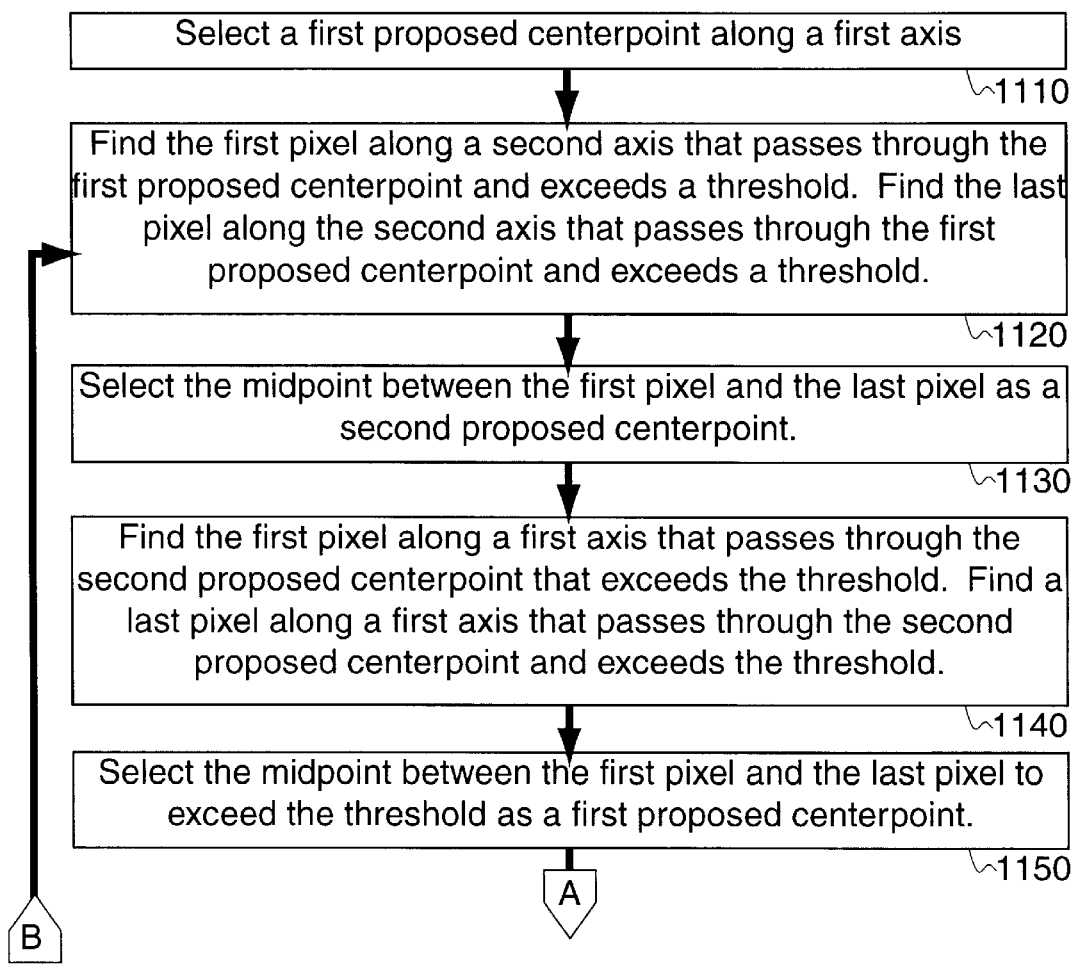
FIGS. 11a and 11b illustrate flow diagram describing the method of locating the center of a annular panoramic image.
Figure 11B:
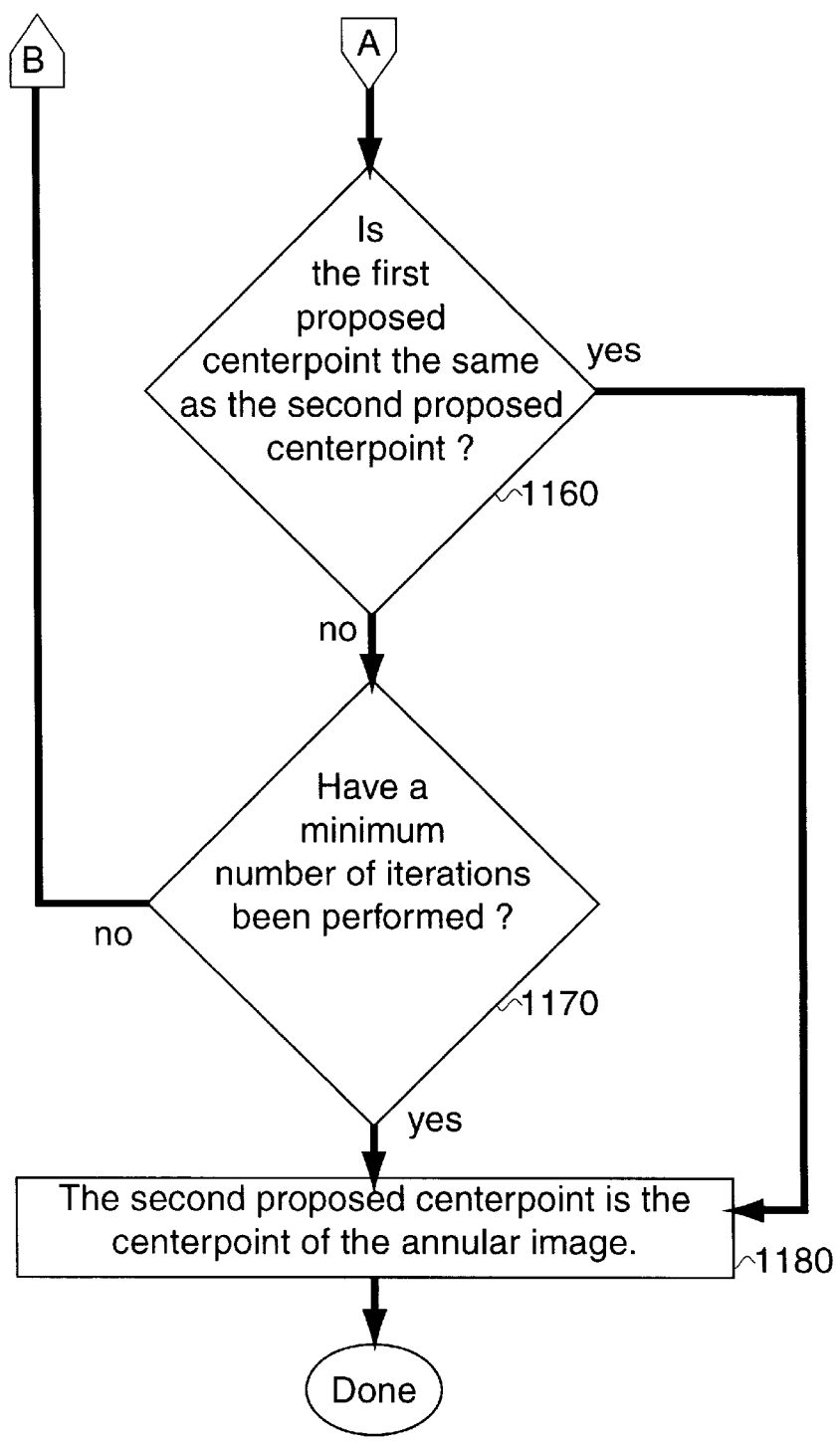

To process an annular image, the center coordinate of the digitized annular image must be known in order to rotate a selected viewport into a standard view. Since gate weave causes the center coordinate to vary, the center coordinate must be determined for each annular image that originated from photographic film. FIGS. 10*b*, 10*b*, 11*a* and 11*b* illustrate a method of determining the center coordinate of an digitized panoramic annular image that originated from photographic film.

Referring to the flow diagram of FIG. 11*a*, step 1110 selects an initial proposed center point along a first axis. Referring to FIG. 10*a*, an initial proposed center point $PC_1$ is illustrated along a Y axis (the first axis). Next at step 1120, the annular video to standard video conversion software finds a first pixel along an orthogonal second axis that passes through the first proposed center point and exceeds a threshold value. In FIG. 10*a* this is illustrated as $FP_1$ on a X axis. As illustrated in FIG. 10*a*, the threshold value is selected to locate the first pixel along the edge of the annular image. Next, a last pixel that exceeds the threshold and is located along the second axis that passes through the first proposed center point ($PC_1$) is selected. In FIG. 10*a*, that last pixel is $LP_1$ along an X axis. Next at step 1130, the converter selects the midpoint between the first pixel $FP_1$ and the last pixel $LP_1$ along the second axis as a second proposed center point. In FIG. 10*a*, the second proposed center point is illustrated as $PC_2$. The second proposed center point is closer to the actual center than the first proposed center point.

This process is repeated again after switching axis. Specifically, in step 1140 a first pixel a first axis that passes through the second proposed center point and exceeds a threshold value is selected as a first pixel. This is illustrated in FIG. 10*b* as point $FP_1$ along a Y axis. Then a last pixel along a first axis that passes through a second proposed center point and exceeds the threshold value is selected. In FIG. 10*b* this is illustrated as $LP_2$. Then a midpoint is selected between the first pixel $FP_2$ and the last pixel $LP_2$ as the third proposed center point. This is illustrated on FIG. 10*b* as third proposed center point $PC_3$. The third proposed center point is also referred to as the first proposed center point for purposes of repeating the method steps.

The method proceeds to step 1160 where it determines if the first/third proposed center point is equal to the second proposed center point. This test determines whether the same center point has been selected again. If this occurs, then the method proceeds down to step 1180 where the second proposed center point is selected as the center point of the annular image. If the first proposed center point is not the same as the second proposed center point the method proceeds to step 1170 where the method determines if a minimum number of iterations have been performed. If this has not occurred, then the method proceeds back up to 1120 where it can repeat additional iterations of the method to determine a more accurate center point.

The foregoing disclosure has described several panoramic camera embodiments. It is contemplated that changes and modifications may be made by one of ordinary skill in the art, to the materials and arrangements of elements of the present invention without departing from the scope of the invention.

We claim:

1. A camera apparatus, said camera apparatus comprising:

an image capture mechanism; and a main reflector, said main reflector reflecting light from a full hemisphere view onto said image capture mechanism;

wherein said main reflector comprises a cylindrically symmetrical shape of a parabola segment rotated about an axis, said parabola segment comprising a vertex, a first side of said parabola segmenty, and a second side of said parabola segment shorter than said first side and adjacent to said axis.

2. The apparatus as claimed in claim 1 further comprising:

a second reflector, said second reflector positioned such that said light is reflected from said main reflector onto said second reflector and then from said second reflector onto said image capture mechanism.

3. The apparatus as claimed in claim 1 wherein said light passes through a set of lenses before landing on said image capture mechanism.

4. A camera apparatus, said camera apparatus comprising:

an image capture mechanism; and a main reflector, said main reflector comprising a paraboloid shape with a dimple on an apex;

wherein said main reflector comprises a cylindrically symmetrical shape of a parabola segment rotated about an axis, said parabola segment comprising a vertex, a first side of said parabola segment, and a second side of said parabola segment shorter than said first side and adjacent to said axis.

5. The apparatus as claimed in claim 4 further comprising:

a second reflector, said second reflector positioned such that said light is reflected from said main reflector onto said second reflector and then from said second reflector onto said image capture mechanism.

6. The apparatus as claimed in claim 5 wherein said light passes through a set of lenses before landing on said image capture mechanism.

* * * * *